Jan. 25, 1966  E. C. HILBERG  3,230,573
OIL CONTAINER FOR GRILLS
Filed April 14, 1964  2 Sheets-Sheet 2

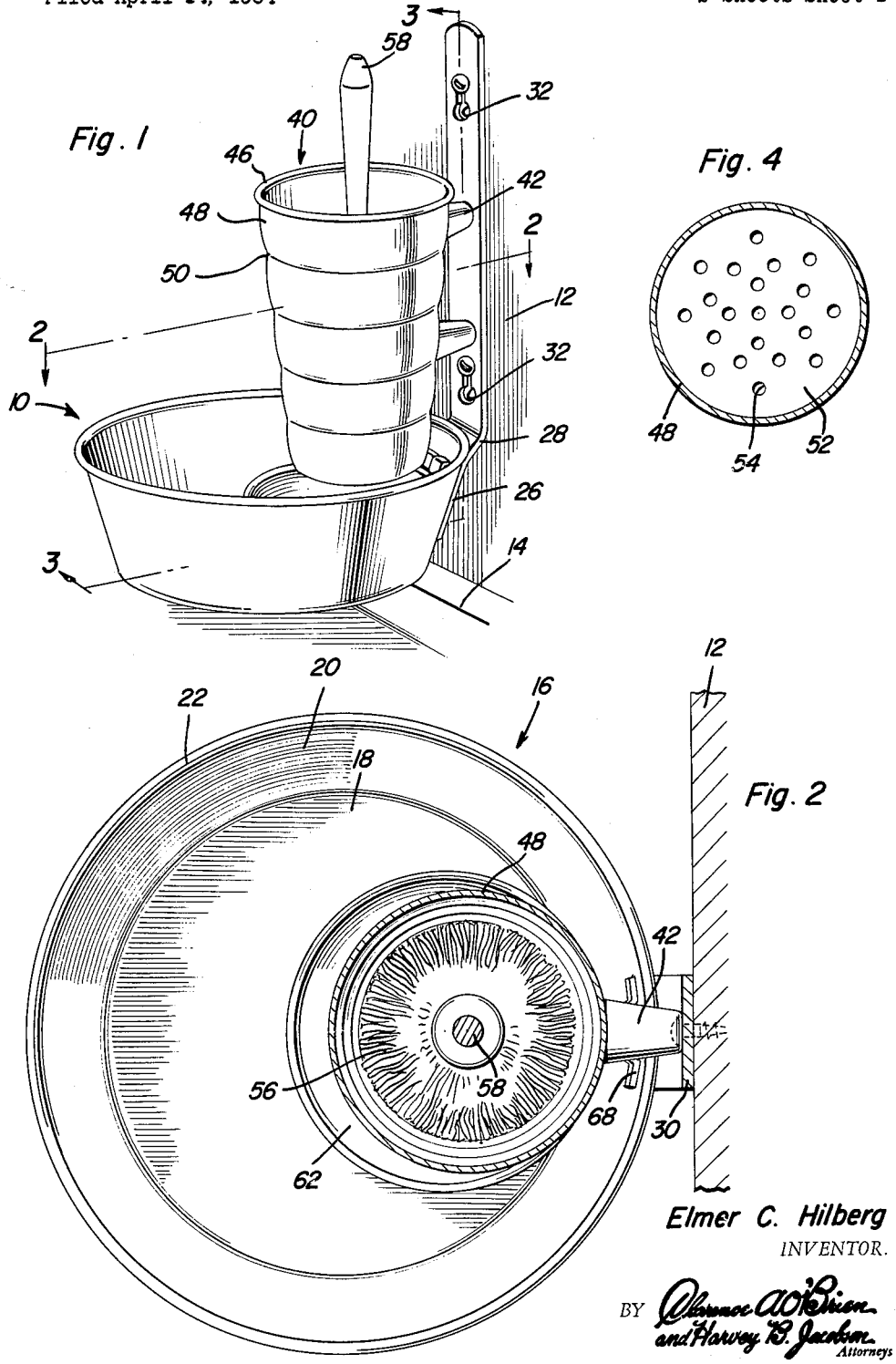

Elmer C. Hilberg
INVENTOR.

BY *Clarence A. O'Brien*
and *Harvey B. Jacobson*
Attorneys

United States Patent Office 3,230,573
Patented Jan. 25, 1966

3,230,573
OIL CONTAINER FOR GRILLS
Elmer C. Hilberg, P.O. Box 2, Friday Harbor, Wash.
Filed Apr. 14, 1964, Ser. No. 359,715
7 Claims. (Cl. 15—521.5)

The present invention generally relates to a device for use in conjunction with restaurant type grills and is in the form of a container for oil such as is normally employed on such a grill that will enable a person to prepare grilled foods with a controlled amount of frying oil thereby eliminating oil waste, oil saturated foods and build-up of carbon on the grill while allowing more working space on the grill as the container does not repose thereon.

The primary object of the present invention is to provide an oil container for use in association with restaurant grills generally in the form of a receptacle for use in holding cooking oil or frying oil together with a holder disposed in overlying relation to the receptacle for supporting the grill mop which is used to spread the frying oil on the restaurant grill. The mop is supported above the oil level in the receptacle so that the excess oil in the mop will drain back into the receptacle.

Another object of the present invention is to provide an oil container and mop holder assembly in accordance with the preceding object together with a sediment cup underlying the holder for the mop so that any oil drained from the mop into the receptacle will first drop into the sediment bowl so that any sediment contained in such oil will be retained in the bowl or cup thus retaining the frying oil in the container in a relatively clean condition.

Still another object of the present invention is to provide an oil container, mop holding and sediment cup assembly in accordance with the preceding object which is simple in construction, easy to use, effective for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the oil container for grills of the present invention;

FIGURE 2 is a plan sectional view taken substantially upon a plane passing along section line 2—2 of FIGURE 1 illustrating the structural relationship of the components of the present invention;

FIGURE 4 is a detailed sectional view taken substantially upon a plane passing along section line 4—4 of FIGURE 3 illustrating the construction of the bottom of the mop holder;

Referring now specifically to the drawings, the numeral 10 generally designates the oil container of the present invention which may be supported on a suitable vertical wall surface 12 or the like either in elevated relationship above a restaurant grill 14 or in any other suitable area adjacent thereto.

Figure 5:
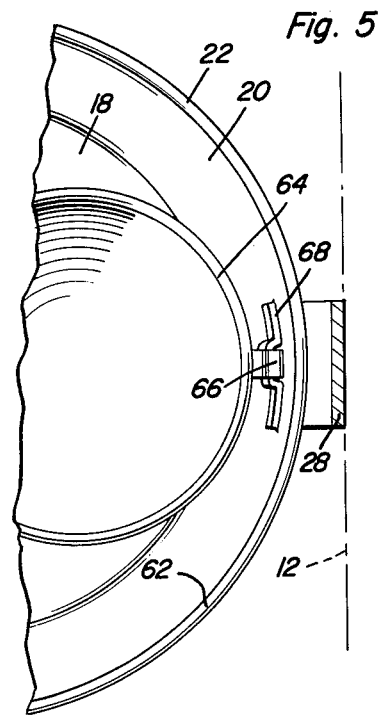
FIGURE 5 is a fragmental plan view illustrating the manner of supporting the sediment cup or bowl in the container.
Figure 3:
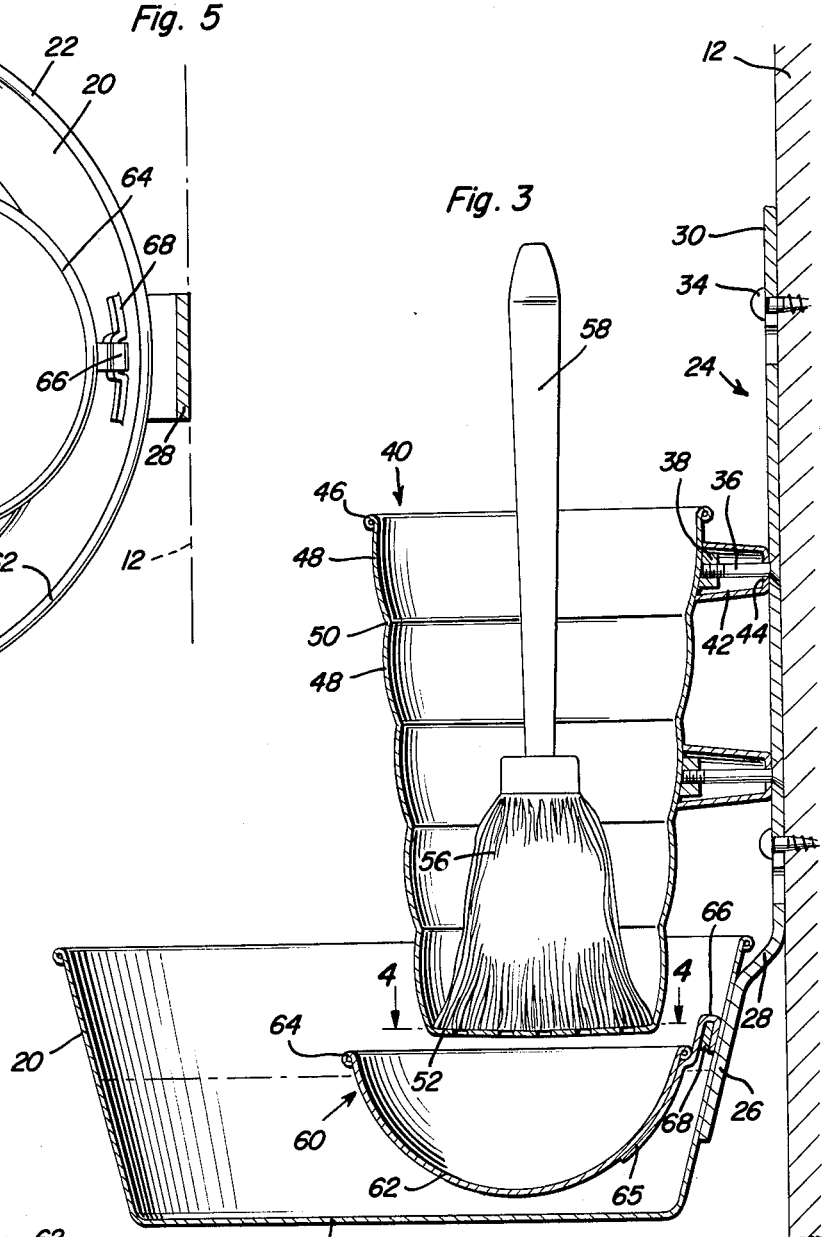
FIGURE 3 is a vertical, sectional view taken substantially upon a plane passing along section line 3—3 of FIGURE 1 illustrating further structural details of the invention.
Figure 6:
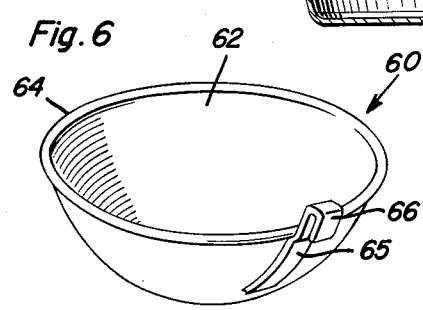
FIGURE 6 is a perspective view of the sediment cup or bowl.

The oil container includes a pan or receptacle 16 including a flat circular bottom 18 and an upstanding outwardly inclined peripheral wall 20 terminating in an outturned or rolled bead or rim 22 which represents substantially conventional kitchen pan constructions. Attached to the wall 20 and extending therealong for a portion of its vertical height is a supporting bracket generally designated by numeral 24 and including an attaching means 26 secured to the wall 20 by any suitable means such as by riveting, bonding, soldering or the like. At the upper end of the attaching portion 26, there is provided an offset portion 28 which is disposed adjacent the rim 22 to avoid interference therewith. Extending upwardly from the offset portion 28 is an elongated supporting portion 30 which is perpendicular in relation to the bottom 18 for support on a vertical wall surface 12 as illustrated in FIGURE 3.

The supporting portion 30 of the bracket 24 includes a pair of vertically spaced key-hole slots 32 which receive the heads of screw-threaded fasteners 34 so that the bracket 24 may be easily mounted on the vertical wall 12 by placing the screw-threaded fasteners in the wall 12 in vertical and spaced alignment with the heads thereof spaced from the wall surface after which the supporting portion 30 of the bracket 24 may be brought into registry therewith and then moved vertically downwardly for interlocking the bracket 24 on the vertical wall surface 12 in an obvious manner. The vertical wall surface may be either a part of the building wall or other restaurant equipment adjacent to the restaurant grill.

Attached to the supporting portion 30 is a pair of laterally extending screw-threaded fasteners 36 which are countersunk into the rear surface of the supporting portion 30 and which are screw-threadedly engaged with a pair of internally threaded nuts 38 that are fixedly secured to a mop holder and drain generally designated by the numeral 40. Surrounding the threaded member 36 is a covering member 42 which has a larger open end secured to the mop holder in encircling and enclosing relation to the internally screw-threaded sockets or nuts 38. The other end of the cover 42 is closed as at 44 and is in close encircling relation to the shank of the screw-threaded member 36 and abuttingly engages the supporting portion 30 of the bracket 24 thereby securing the mop holder fixedly to the supporting portion 30 of the bracket 24 in an obvious manner.

The mop holder 40 is generally in the form of a truncated cone and includes an annular outwardly rolled lip 46 at the upper edge thereof and a plurality of segments 48 disposed in vertical orientation in relation to each other and interconnected at lines of separation 50. Each segment has a smaller bottom diameter than top and the upper diameter of a lower section is equal to the lower diameter of an upper section with the vertical cross sectional configuration of each segment 48 being arcuate in configuration as illustrated in FIGURE 3 thus forming a generally downwardly and inwardly tapering holder in which the annular wall is provided with a plurality of ridges formed at the lines of juncture 50 between the segments 48. The bottom of the mop holder 40 is designated by the numeral 52 and the bottom includes a plurality of relatively closely spaced apertures 54 which form a drain for excess oil which may be in the grill mop 56 so that such oil may drain through the bottom 52. As illustrated in FIGURE 3, the grill mop 56 is provided with an elongated handle 58 which projects above the rolled edge 46 of the holder when it is placed therein so that the handle 58 may be engaged and manipulated for forcing the mop against the wall of the holder 40 and excess oil extracted or removed therefrom with this operation being facilitated by the vertically spaced ridges so that as the mop is moved upwardly alongside of the peripheral wall of the holder 40 excess oil will be removed therefrom in an obvious manner.

Underlying the mop holder 40 is a sediment cup generally designated by the numeral 60 and including a generally bowl-shaped member 62 which has an outwardly rolled rim 64 at the upper edge thereof and having a diameter in excess of the diameter of the bottom 52 of the mop holder 40. One edge of the generally semispherical bowl 52 is provided with an attaching bracket 65 having a downwardly opening hook-shaped member 66 thereon for engagement with a supporting loop 68 carried by the inner surface of the wall 20 of the receptacle 16 thus detachably supporting the sediment cup or bowl 60 in place thereon.

The structure of the components of the present invention may be of any suitable material such as normally employed in kitchen pots and pans and the size requirements may vary but it has been found that a receptacle of about 3 inches in depth with a six-inch bottom is adequate and the holder may be approximately five and one-half inches long with the bottom thereof being approximately two and one-half inches in diameter. The sediment cup may be approximately three and one-half inches in diameter at the upper end thereof and one and one-half inches deep.

In using the device, frying oil generally not to exceed approximately three cups is placed in the receptacle 16. The grill mop 56 is dipped in the oil and then placed in the truncated cone-shaped holder 40 where the oil is slightly removed by slight pressure on the perforated bottom 52 thus controlling the amount of oil needed for each specific use. The mop rests in the truncated cone holder 40 between usage in order for oil to drain therefrom. As the mop drains, any sediment from the mop which has been picked up by its engagement with the restaurant grill will settle in the bottom of the sediment cup 60. As the sediment cup fills, the oil will overflow over the edges thereof back into the receptacle and this oil will be clean and free from sediment. Of course, the sediment bowl may be cleaned periodically as may the other components of the invention. By using this invention, there is provided a modern, economical and sanitary method of holding and dispensing grill oil to be used in any facility that operates a grill. By using the present invention, the users may save approximately fifty percent of the oil normally used for grill cooking. This device also gives complete control of oil usage on the grill and prevents oil saturation of food prepared on the grill. Further, the use of the invention permits the preparation of low fat food on any grill and will keep the oil from getting rancid and prevents the grill mop from resting in and picking up food sediments thereby greatly improving the flavor, appearance and wholesomeness of food prepared on the grill. In addition, by installing the device in elevated relationship to the grill surface, there is provided more usable grill inasmuch as it is conventional to rest the oil container directly on the grill surface which does take up a portion of the usable grill area.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An oil container for restaurant grills comprising a receptacle having an open top, a mop holder having a perforated bottom supported in overlying relation to the open top receptacle, and a sediment bowl supported in underlying relation to the mop holder for receiving drainage from the mop and discharging oil back into the receptacle.

2. The structure as defined in claim 1 wherein said receptacle includes an upwardly extending supporting bracket attached thereto, said mop holder being connected to said bracket, and means supporting said sediment cup below the lower end of the mop holder.

3. The structure as defined in claim 2 wherein said means for supporting the sediment cup includes a downwardly opening hook attached to the sediment cup, a loop attached to the peripheral wall of the receptacle for detachably receiving the hook thereby supporting the sediment cup in position within the confines of the receptacle.

4. The structure as defined in claim 2 wherein said supporting bracket includes a plurality of key-hole slots formed therein for interlocking engagement with headed fasteners disposed on a vertical supporting surface.

5. The structure as defined in claim 1 wherein said mop holder is in the shape of a truncated cone, said truncated cone being constructed of a plurality of segments of progressively diminishing dimensions for forming a plurality of annular proturberances for facilitating removal of excess oil from the mop when engaged therewith and moved longitudinally of the holder.

6. A holder for a restaurant grill mop comprising a hollow container, means for supporting said container, said container including a perforated bottom for drainage of excess oil from the mop, said container tapering from top to bottom, a plurality of vertically spaced annular ridges extending inwardly into the interior of the container for engagement by the mop when moved in relation to the container for facilitating removal of excess oil from the mop, and a shallow sediment cup disposed below the bottom of the holder for receiving oil and sediment from the mop for retaining sediment and permitting oil to overflow into an underlying receptacle.

7. A restaurant grill oil container and grill oil mop holder and drain assembly comprising an open-topped receptacle for receiving a quantity of oil, an open-topped container supported in overlying relation to the receptacle, said container having a perforated bottom to permit excess oil to drain therefrom, while supporting the mop, and a shallow sediment bowl supported below the bottom of the container for receiving oil drained therefrom, said bowl being supported in overlying relation to the receptacle for overflow discharge of oil back into the receptacle.

References Cited by the Examiner

FOREIGN PATENTS 626,293   8/1961   Canada.

CHARLES A. WILLMUTH, *Primary Examiner.*

PHILIP R. ARVIDSON, *Assistant Examiner.*